Figure 1:
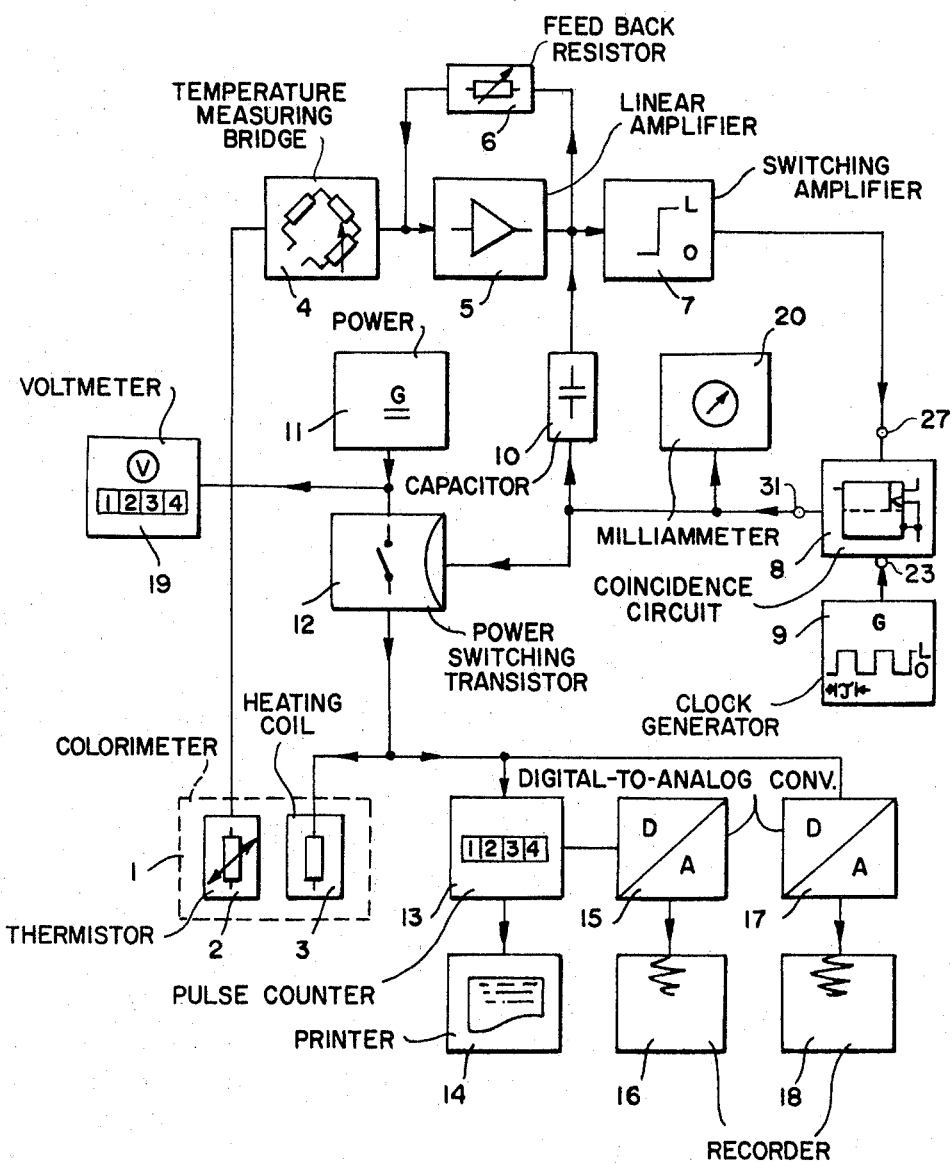

United States Patent [19]
Koehler et al.

[11] 3,869,914
[45] Mar. 11, 1975

[54] ISOTHERMAL CALORIMETRY METHOD AND APPARATUS THEREFOR

[75] Inventors: Waldemar Koehler; Oswald Riedel; Hertbert Scherer, all of Ludwigshafen; Georg Schlereth, Limburgerhof, all of Germany

[73] Assignee: Badische Anilin- & Soda-Fabrik Aktiengesellschaft, Ludwigshafen/Rhein, Germany

[22] Filed: Nov. 24, 1972

[21] Appl. No.: 308,997

[30] Foreign Application Priority Data
Nov. 25, 1971 Germany............................ 2158377

[52] U.S. Cl............................................. 73/190 R
[51] Int. Cl...................... G01k 17/00, G01h 25/48
[58] Field of Search............... 73/15, 190; 23/253 R; 219/497, 499

[56] References Cited
UNITED STATES PATENTS

| | | |
|---|---|---|
| 2,972,885 | 2/1961 | Laub..................................... 73/204 |
| 3,085,431 | 4/1963 | Yerman et al......................... 73/204 |
| 3,267,728 | 8/1966 | Solomons............................. 73/190 |
| 3,603,147 | 9/1971 | Dorman................................ 73/204 |

OTHER PUBLICATIONS

Anderson "Polymerization Rates by Calorimetry" in J. of Polymer Science A-1 Vol. 7 pg. 2889-2896.

*Primary Examiner*—Herbert Goldstein
*Attorney, Agent, or Firm*—Johnston, Keil, Thompson & Shurtleff

[57] ABSTRACT

Method and apparatus for isothermal calorimetry in which the temperature within the calorimeter is maintained at a constant value by the application of energy in the form of pulses of constant power, which pulses are counted and summated, the number of pulses per unit time being determined by temperature control means.

4 Claims, 3 Drawing Figures

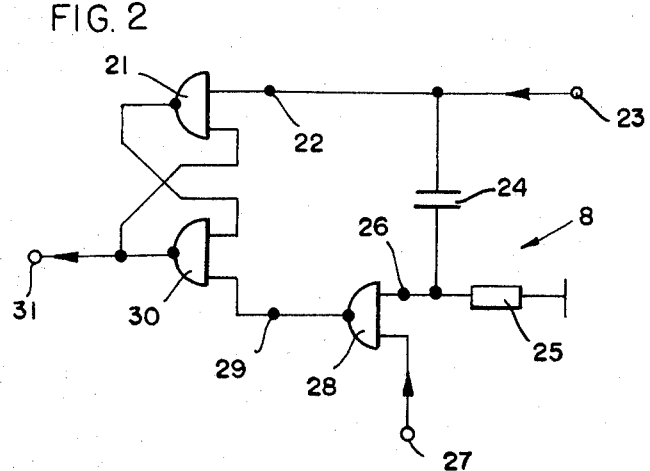
FIG. 2
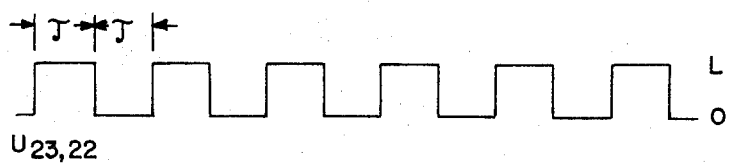
FIG. 3a
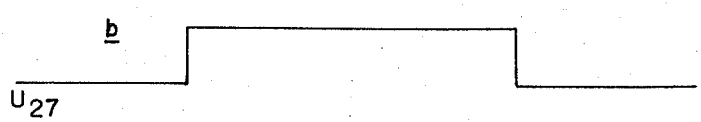
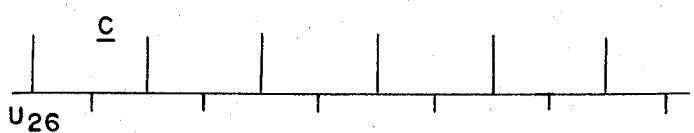
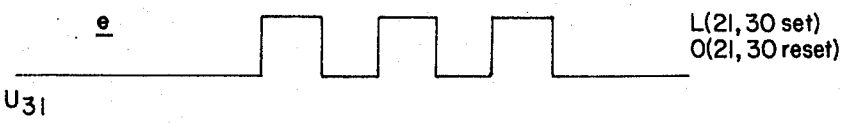

ISOTHERMAL CALORIMETRY METHOD AND APPARATUS THEREFOR

This invention relates to a method and apparatus for isothermal calorimetry of physical and/or chemical reactions in which the temperature of the reactants is maintained at a constant value by the application of electrical energy both in endothermal and in exothermal processes.

Unlike adiabatic calorimetry, in which a rise or fall in temperature caused by a change in the reactants concerned serves as a process variable, the temperature sensor used in isothermal calorimetry is not required to provide quantitative measurements but merely to serve as sensor in the control circuit in which the process variable is the energy added. For example, where an endothermal reaction is taking place, the controller causes energy to be added to the reaction vessel of the calorimeter in such an amount or at such a rate that the temperature in said reaction vessel remains constant within the response limits of the control system. The amount of heat consumed by the reaction is thus equivalent to the amount of energy added, this conveniently being represented as a time integral of the heater power required over and above the steady-state power level. To ensure correct functioning it is essential to provide a steady-state heat flux from the reaction vessel to a thermostatically controlled surrounding reservoir, which heat flux is maintained constant by keeping the temperature of the reaction vessel at a constant value.

In the case of an exothermal reaction, less heater power is required to maintain the temperature in the reaction vessel at a constant value. It is merely necessary to select a steady-state power level which is sufficiently high. Suitable selection also makes it possible to measure those reactions in which there is a change from endothermal to exothermal conditions or vice versa. Such a change in conditions may be caused, for example, by the occurrence of endothermal heat of solution when a reactant is initially added, followed by the generation of exothermal heat of reaction.

Isothermal calorimetry has the following special advantages over the frequently used adiabatic calorimetry:

1. it is not necessary to determine the specific heats of the reactants and reaction products and the water equivalent of the apparatus;
2. the measuring time may be extended over a long period, so that reactions of long duration may be measured not only in respect of the heat produced or consumed but also in respect of kinetics.

The obvious main advantages of isothermal calorimetry have been the cause of the development of a number of systems in the past.

In a system described by H. M. Andersen in J. Polym. Sci., A-1, Vol. 7, pp. 2289 to 2896 (1969), the temperature sensor present in the reaction vessel comprises one arm of a resistance bridge and is opposed to a reference sensor present in the thermostatically controlled surrounding reservoir. The heater element in the reaction vessel is driven by a variable transformer which is adjusted by the amplified signal via a servomotor with gear-train and feedback potentiometer. The variable transformer is necessary because the conventional wattmeter indicating the process variable requires a pure sine wave.

Another arrangement, described by F. Becker and W. Wallisch in "Zeitschrift fur Physikalische Chemie," New Series, 36 (1963), pp. 97–102; 46 (1965) pp. 268–278 and 46 (1965) pp. 279–293, is restricted to the measurement of exothermal processes. The reaction vessel containing the sample to be analyzed is placed on a Peltier element of stove-plate form. A rise in temperature in the reaction vessel is balanced by a reduction of heat output of the Peltier element by electrical means, since the current passing through the Peltier element is controlled as a function of the said temperature rise. The control circuit required consists of transforming and linearizing units and the high cost of this system is similar to that of the above-described temperature control circuit incorporating a servomotor. Another disadvantage of this system is that electrical insulation must be provided between the reaction vessel and the Peltier element and this electrical insulation also acts as thermal insulation and consequently hampers the transfer of heat to the Peltier element. Measuring errors thus incurred can be eliminated only at great expense. Furthermore, since Peltier elements of known kinds may only be used at temperatures of up to not more than 80°C, the use of such a measuring system is restricted to firstorder exothermal reactions up to temperatures of not more than 80°C.

A further drawback of the prior art systems of isothermal calorimetry is that the measured variable is not registered digitally but is recorded as an analogous value. It is desirable to provide a direct digital form of the measured variable with a view to further digital evaluation of the data obtained.

The fact that the controlled adjustment of power at constant temperature of the material being tested in calorimetry techniques may be carried only to an unsatisfactory degree is the reason for the restricted use of isothermal calorimetry despite its obvious main advantages, whereas there are commercially available apparatus for carrying out the inferior methods of adiabatic calorimetry.

It is an object of the present invention to provide a simple method and simple and convenient systems for carrying out such method, enabling both endothermal and exothermal conversions to be digitally measured on the principle of isothermal calorimetry, both calorifically and kinetically.

According to the present invention, this object is achieved in a method in which the energy is applied to the reaction vessel in the form of pulses of constant energy content, which are counted in order to measure the energy consumed per unit time and which are continuously summated in order to measure the energy balance, the number of pulses per unit time being determined by temperature control means.

In this way, an effectively continuous control of the power applied to the reaction vessel is attained so that the temperature in the reaction vessel is held extremely constant.

In a further embodiment of the method of the invention, the pulses are frequency modulated. This makes it possible to use a highly constant source of potential with the result that the quantum of energy represented by each pulse is kept constant to the required high degree.

The term "frequency modulation" is used herein in the sense that there is a change in overall (average) frequency, that is, a change in the number of pulses per unit of time, when measured over a time interval extending over a plurality of pulse groups.

Another advantageous embodiment of the invention consists in that the time intervals between pulses, as determined by temperature control via frequency modulation, are integral multiples of the duration of one pulse.

This simplifies the method of the invention, since the duration of the pulse is also a unit for the intervals between the pulses, both variables being conveniently controlled by one and the same clock generator.

The method of the invention may be advantageously carried out using an arrangement in which the desired temperature in the reaction vessel is set by means of a thermistor bridge, whilst the actual temperature is fed to the thermistor bridge from a temperature sensor provided in the reaction vessel, the voltage signal at the output of the thermistor bridge being reshaped in an amplifier and shaping stage and then used to drive a coincidence circuit which is also driven by a clock generator and which allows the passage of whole pulses only.

In an advantageous embodiment of the arrangement of the invention, a linear amplifier is provided for the amplification of the control deviation, the degree of amplification of said amplifier being adjusted by a variable resistor shunted between its input and output. This makes it possible to balance the proportional part of the control.

The pulses provided at the output of the coincidence circuit, in coincidence with the said voltage signal, may be advantageously fed back to the output of the linear amplifier by way of a capacitor. This results in an integrating controlling action. As a result of this P + I controller action of the temperature controller in conjunction with the constant quanta of energy in the pulses there is the advantage that even when the temperature in the reaction vessel deviates only slightly from the desired value, control measures are immediately carried out and the required constancy of temperature is reestablished.

Further details of the invention will be apparent from the following description of an embodiment of the invention illustrated in the accompanying drawings, in which:

FIG. 1 is a block diagram of the arrangement used for carrying out the method of the invention, FIG. 2 is a circuit diagram of the coincidence circuit and FIG. 3 shows the signals as a function of time at various points of the circuit shown in FIG. 2.

Referring to FIG. 1, the calorimeter 1, indicated by broken lines, contains in its reaction vessel a heating coil 3 and a thermistor 2 as a temperature sensor. The thermistor 2 constitutes part of a temperature measuring bridge 4, by means of which the desired temperature may be set to a value between minus 20°C and plus 250°C. The bridge becomes out of balance immediately the actual temperature in the reaction vessel differs from the desired temperature. This deviation formed by the bridge 4 is amplified by a linear amplifier 5. The amplified deviation is fed back to the input of the amplifier through a variable feed-back resistor 6 in order to provide the proportional part of the control. A series-connected switching amplifier 7 drives a coincidence circuit 8 which brings the signal leaving the amplifier 5 into coincidence with the pulses provided by a clock generator 9.

The pulses generated by the clock generator 9 are rectangular pulses having a duration $\tau$ separated by intervals of the same length. Since, in accordance with the present invention, the energy is ascertained by counting the heating pulses, only control pulses having the full width $\tau$ may be passed to the power switch 12. This is ensured by the coincidence circuit 8 which gates only full pulses irrespective of time differences in the occurrence of the heating commands from switching stage 7 and the pulses from the clock generator 9.

A coincidence circuit 8 producing such an effect is represented by a flip-flop circuit having a dynamic enabling input 27 and setting and resetting points 26 and 22 and may be realized in its simplest form by three NAND blocks 21, 30 and 28 as shown in FIG. 2.

When a clock pulse signal passed from clock generator 9 to the input 23 of the coincidence circuit 8, FIGS. 1 and 2, changes from O to L, as represented in line $U_{23, 22}$ of the pulse chart, the NAND block 28 receives at its input point 26 via capacitor 24 a brief positive-going signal, these signals being represented in the upper portion of line $U_{26}$, and as a result it simultaneously transmits a short-negative going signal as shown in line $U_{29}$ to the input point 29 of the following flip-flop circuit 21, 30; however, as will be clear from a comparison of line $U_{29}$ with lines $U_{26}$ and $U_{27}$, this short negativegoing signal is produced only if at the same time an enabling signal, shown on line $U_{27}$, is applied to input 27 by the switching amplifier 7. At the same time the flip-flop circuit consisting of the two NAND blocks 21 and 30 is set at 29 and consequently the signal, shown on line $U_{31}$, at the output 31 of this flip-flop circuit changes its potential from O to L and the output 31 thus delivers a heating command. The termination of the heating command pulse, i.e., the change of potential of the signal on line $U_{31}$ from L back to O, is independent of the signal, line $U_{27}$, and it occurs as each clock pulse, line $U_{23}$, acting on the resetting input point 22 of the flip-flop circuit, causes this circuit to reset. As will be noted from FIG. 3, this same cycle of operation repeats itself, that is the production of another full pulse, line $U_{31}$, is triggered, everytime a positive-going pulse on line 26 occurs while an enabling signal, line $U_{27}$, is present at input 27. By suitable selection of the capacitor 24 and resistor 25 it is possible to reduce the width of the signals on line $U_{26}$ and thus of the signals on line $U_{29}$ by 3 or 4 tenths powers of the pulse width $\tau$. Provided that the power switch 12 oeprates sufficiently rapidly, the energy is determined by merely measuring the energy per heating pulse and by counting the heating pulses.

The pulses gated by the coincidence circuit 8 control a power switching transistor 12 which in turn switches the heating coil 3 on and off accordingly, the said coil being connected to a highly constant voltage source 11. The integrating part of the control is produced by feedback of the pulses gated by the coincidence circuit to the input of the switching amplifier 7 through a suitably dimensioned capacitor 10. This feedback tends to sustain the input to switch amplifier 7 at a point above the threshold level once this level has been reached, thereby counteracting excessive switching of the switching amplifier everytime the output of amplifier 5 drops momentarily below the threshold level. The milliammeter 20 connected at a point between the coincidence circuit 8 and the switching transistor 12 gives a control reading which is proportional to the switched heating power and which is mainly useful as a means of orientation when the digital or analogous recording means described below have not yet been put in service, for example during the starting period of the apparatus. Within a few microseconds, the switching transistor 12 switches from currents of a few microamps to currents of several amperes. The heating coil 3 is of the bifilar type and is thus non-inductive so that build-up transients are avoided despite the rapid switching involved. The supply voltage from the voltage source 11 can be switched to 4 different values.

Via a digital-to-analog converter 17, which in this case takes the average of the number of pulses per unit time, a penrecorder 18 records the input to the heating coil 3 in watts or calories/sec. as a function of time. The power integral may be given in watt-seconds or calories as a function of time on a pen-recorder 16 controlled by a readily obtained signal derived from a pulse counter 13 followed by conversion in a digital-to-analog converter. However, this recording is, on account of its method of production, less accurate than the recording of the power input.

The above-described substantially digital principle of control also permits another kind of recording which is more accurate than the above-described analog recording on a chart. This other kind of recording consists in counting the number of control pulses gated by the coincidence circuit or the heating pulses derived from the power switching transistor 12, as a function of time. This is conveniently carried out using a commercially available electronic counter 13 having a high input impedance and which cumulatively counts the pulses delivered within a predetermined time interval and records the results on a paper tape by means of a digit printer 14. Depending on the rate of the reaction and on the power level set, the cumulation intervals are selected at from 2 to 10 seconds.

In order to have direct visual control of the state of the calorimeter and of course of the reaction, it is possible and advisable, when using the arrangement shown in FIG. 1, to have both the printer 14 and one of the pen-recorders 16 and 18 for analogous signals running simultaneously.

As soon as the temperature sensed by the thermistor 2 deviates by at most 0.01°C from the setting of the isothermal state on the bridge 4, the power switching transistor 12 delivers heating pulses to the heating coil 3. The desired temperature is set by means of a precision potentiometer comprising one arm of the thermistor bridge 4. If the deviation from the temperature setting is above the response threshold, the interval between pulses is reduced to its minimum value $\tau$, i.e. the heating coil 3 is under full load. If an exothermal reaction is expected, it is convenient to operate with overcompensation, i.e. the steady-state condition is selected at high load but not quite full load, as otherwise the control range would be clipped on one side. If an endothermal reaction is expected, the steady-state condition is advantageously selected near zero load.

The necessary calibration of the power input is conveniently carried out as a purely electrical measurement of the quantum of energy contained in the pulse. The duration of the pulse $\tau$ is given by the accurately measurable frequency of the clock generator 9. The height of the pulse is measurable at the output terminals of the constant voltage source 11 using an accurate voltmeter 19, for example a digital voltmeter. The resistance R of the heating coil may be determined using an accurate resistance bridge. For this calibration it is advantageous to immerse the heating coil 3 in baths held at various temperatures so as to find the temperature coefficient of R.

The reaction vessel of the calorimeter 1 may be of known design. Advantageously, it is separated from a jacketing vessel (not shown), through which liquid from a sufficiently large thermostat flows, by a surrounding air gap which forms the main source of resistance to the conduction of heat from the reaction vessel to the thermostatically controlled jacketing vessel. The temperature differential between the jacketing vessel and the reaction vessel is selected so that the steady-state power level of the temperature and power control device of the invention, as required to compensate for the said heat flux, may be adjusted to a level suitable for the measurements to be carried out. Within the range 0° to 200°C, the heat flux is merely dependent on the temperature differential between the reaction vessel and the jacketing vessel and not on the actual temperature of the reaction vessel. The contents of the reaction vessel are preferably stirred by a magnetic stirrer so as to avoid the use of a stirrer presenting sealing problems.

If, in the examination of reactions between solids and gases, the reaction vessel is provided with means for feeding a gas stream, the gas passing through the reactor may be subsequently passed through an analyzer such as a gas chromatograph. This makes it possible to carry out calorimetric tests in conjunction with quantitative analysis to a marked degree of accuracy.

Using a practical arrangement as described above, it has been possible to measure heat quantities as low as 0.1 calory, so that it is possible to examine very low calorimetric effects at a high degree of accuracy.

We claim:

1. An isothermal calorimetry method for examining physical and/or chemical reactions of both endothermal and exothermal types, in which the temperature of the reactants is maintained at a constant value by the application of energy to an isothermal calorimetry zone, which comprises: applying said energy in the form of pulses of constant energy content; generating temperature control signals in accordance with the temperature of said reactants in said calorimetry zone; controlling the number of said pulses of constant energy transmitted per unit time, by means of said control signals while insuring that said constant energy pulses are separated in time so that the intervals between any two transmitted pulses are integral multiples of the duration of one pulse regardless of the phase of any said control signal in relation to said pulses; and summating continuously the numbers of said pulses per unit time to measure the energy balance.

2. Apparatus for isothermal calorimetric examination of physical and/or chemical reactions of both endothermal and exothermal types, in which the temperature of the reactants is maintained at a constant value by the application of energy and which comprises a calorimetric vessel adapted to carry out endothermal and exothermal physical and/or chemical reactions, a temperature sensor in said vessel, and electrical energy supply means for maintaining the temperature of said reactants in said vessel at a constant value, said electrical energy supply means embodying: a clock generator for supplying clock pulses of a given duration; a thermistor bridge responsive to said temperature sensor for producing a voltage signal; switching means in circuit connection with the output of said thermistor bridge and controlled by said voltage signal; a coincidence circuit means connected to the output of said switching means and to the output of said clock generator and arranged to effectively pass said clock pulses as long as the bridge output is of a level sufficient to keep said switching means activated, except insuring passage of only whole clock pulses of said given duration regardless of phase differences as between the activations and deactivations of said switching means and the beginnings and ends of said pulses, whereby as many whole, constant energy pulses are passed per unit time as are required to maintain isothermal conditions in said vessel; and mean for continuously summating said numbers of said pulses per unit time to measure the balance of energy transmitted to said vessel.

3. Apparatus as claimed in claim 2, wherein a linear amplifier is interposed between said output of said thermistor bridge and the input of said switching means, and wherein a variable resistor is connected in shunt between the input and output of said linear amplifier to render the feedback of said amplifier adjustable.

4. Apparatus as claimed in claim 3, wherein there is connected between the output of said coincidence circuit means and the input of said linear amplifier a capacitor for feeding the pulses in coincidence with said voltage signal, back from the output of the coincidence circuit means to the output of said linear amplifier, thereby to counteract excessive switching of said switching means.

* * * * *